United States Patent
Layne et al.

(10) Patent No.: US 9,340,362 B2
(45) Date of Patent: May 17, 2016

(54) CONVEYOR WITH IMPROVED CLEANING CAPABILITIES

(75) Inventors: James L. Layne, Bowling Green, KY (US); Lewis W. Ward, Glasgow, KY (US); B. Keith Thomas, Cave City, KY (US); Scott Dayton Barbour, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 151 days.

(21) Appl. No.: 14/131,308

(22) PCT Filed: Jul. 9, 2012

(86) PCT No.: PCT/US2012/045895
§ 371 (c)(1),
(2), (4) Date: Jan. 13, 2014

(87) PCT Pub. No.: WO2013/006851
PCT Pub. Date: Jan. 10, 2013

(65) Prior Publication Data
US 2015/0284187 A1   Oct. 8, 2015

Related U.S. Application Data

(60) Provisional application No. 61/505,331, filed on Jul. 7, 2011.

(51) Int. Cl.
*B65G 21/12* (2006.01)
*B65G 21/00* (2006.01)
*B65G 21/20* (2006.01)
*B65G 17/08* (2006.01)

(52) U.S. Cl.
CPC ............... *B65G 21/12* (2013.01); *B65G 17/08* (2013.01); *B65G 21/00* (2013.01); *B65G 21/2063* (2013.01)

(58) Field of Classification Search
CPC .............................. B65G 21/12; B65G 17/08
See application file for complete search history.

(56) References Cited

U.S. PATENT DOCUMENTS

| | | | |
|---|---|---|---|
| 3,169,630 A | 2/1965 | Christiansen | |
| 3,348,678 A | 10/1967 | Flowers | |
| 3,456,776 A | 7/1969 | Viene | |
| 3,828,913 A | 8/1974 | Scholler | |
| 3,993,185 A | 11/1976 | Fleckenstein et al. | |
| 4,037,740 A | 7/1977 | Wood et al. | |
| 4,261,460 A * | 4/1981 | Peterson, II | B65G 21/04 198/828 |
| 4,475,648 A | 10/1984 | Weeks | |
| 4,846,337 A | 7/1989 | Kuehlmann | |

(Continued)

FOREIGN PATENT DOCUMENTS

| | | | | |
|---|---|---|---|---|
| GB | 888112 A | * | 1/1962 | ............ B65G 39/10 |
| JP | 11-020916 A | | 1/1999 | |
| JP | 2002-114351 A | | 4/2002 | |

*Primary Examiner* — Thomas Randazzo
(74) *Attorney, Agent, or Firm* — King & Schickli, PLLC

(57) ABSTRACT

A conveyor with enhanced cleanability includes a belt for conveying objects above a floor and having a forward run and a return run. A conveyor bed for supporting the belt provides an upper support for supporting the forward run of the belt and a lower support for supporting a return run of the belt. The upper support is adapted for moving toward and away from the lower support, including when the conveyor belt is sectioned into first and second portions corresponding to the forward run and the return run. A conveyor is also mounted in a cantilevered fashion, such as by embedding posts in a curable material forming a base for supporting the conveyor. Related methods are also disclosed.

23 Claims, 9 Drawing Sheets

(56) References Cited

U.S. PATENT DOCUMENTS

| | | | | |
|---|---|---|---|---|
| 5,360,097 | A | 11/1994 | Hibbs | |
| 5,458,051 | A | 10/1995 | Alden et al. | |
| 5,544,733 | A | 8/1996 | Shaver | |
| 5,655,647 | A * | 8/1997 | Wheeler | B65G 41/002 198/861.5 |
| 5,686,004 | A | 11/1997 | Schneider | |
| 5,915,527 | A * | 6/1999 | Nakamura | B65G 15/62 198/823 |
| 6,227,355 | B1 | 5/2001 | White et al. | |
| 6,227,377 | B1 | 5/2001 | Bonnet | |
| 6,367,613 | B1 | 4/2002 | Montgomery | |
| 6,371,283 | B1 | 4/2002 | Manchester | |
| 6,409,011 | B1 * | 6/2002 | Ferguson | B65G 15/00 186/68 |
| 6,484,869 | B1 * | 11/2002 | Brouwer | B66B 29/09 193/35 G |
| 6,578,705 | B2 | 6/2003 | Lunghi | |
| 6,585,110 | B2 * | 7/2003 | Layne | B65G 17/08 198/838 |
| 6,591,979 | B1 | 7/2003 | Karpy | |
| 6,634,490 | B2 | 10/2003 | Fischer et al. | |
| 6,769,856 | B2 | 8/2004 | Padovani | |
| 6,910,586 | B2 | 6/2005 | McCloskey | |
| 6,964,331 | B1 | 11/2005 | Kerr | |
| 6,997,307 | B2 | 2/2006 | Iseli | |
| 7,234,590 | B1 * | 6/2007 | Le Borgne | B65G 21/12 198/592 |
| 7,267,223 | B2 | 9/2007 | Spoors | |
| 7,383,944 | B2 | 6/2008 | Hall et al. | |
| 7,549,531 | B2 * | 6/2009 | Hosch | B65G 21/105 198/493 |
| 7,601,053 | B2 | 10/2009 | Brandt et al. | |
| 7,762,387 | B2 | 7/2010 | Dunn | |
| 7,770,720 | B2 * | 8/2010 | Freudelsperger | B65G 1/00 198/583 |
| 7,891,479 | B2 | 2/2011 | Evangelista et al. | |
| 7,909,153 | B2 * | 3/2011 | Pogue | B65G 21/14 198/312 |
| 7,918,332 | B2 | 4/2011 | Vaughn, Jr. et al. | |
| 7,950,520 | B2 | 5/2011 | Mott | |
| 7,954,626 | B2 | 6/2011 | Eigenfeld | |
| 9,016,468 | B2 * | 4/2015 | Ventz | B65G 21/14 198/861.5 |
| 2006/0252591 | A1 * | 11/2006 | Winkelmolen | B65G 21/06 474/153 |
| 2006/0254887 | A1 | 11/2006 | Aubry et al. | |
| 2009/0301357 | A1 | 12/2009 | Fourney et al. | |
| 2010/0294624 | A1 | 11/2010 | Warner | |
| 2011/0017573 | A1 | 1/2011 | Karpy | |

* cited by examiner

CONVEYOR WITH IMPROVED CLEANING CAPABILITIES

This application claims the benefit of U.S. Provisional Patent Application Ser. No. 61/505,331, the disclosure of which is incorporated herein by reference.

TECHNICAL FIELD

This disclosure relates to the conveyor arts and, more particularly, to a conveyor with the ability to be cleaned in a more efficient and effective manner.

BACKGROUND

Conveyors may be used in a multitude of applications for transporting objects, including in connection with the conveyance of food products and other products from which particles or debris may shed and become trapped in nooks or crevasses. This can lead to unsanitary conditions and deleterious results if left unabated. Cleaning and removing unwanted debris may involve removing portions of the conveyor system to access otherwise inaccessible portions of the conveyor. Depending on the location and volume of the debris, this process may involve shutting down the conveyor system for a long period of time and possibly even necessitate disassembling the system, which results in costly inefficiencies.

Accordingly, a need is identified for an improved conveyor that allows for easy removal of debris, improved maintenance of sanitary conditions, and general ease of access to the moving parts of the conveyor.

SUMMARY

In one aspect, an apparatus for supporting a conveyor belt for conveying objects in a conveying direction above a floor. The belt may include an upper forward run and a lower return run forming a conveying path extending in the conveying direction. The apparatus comprises a conveyor bed for supporting the conveyor belt, and includes a first support for supporting the forward run of the belt and a second support connected to the first support for supporting the return run of the conveyor belt. The first support for the forward run of the conveyor belt is adapted for being raised relative to the second support for the return run of the conveyor belt.

In one embodiment, the first support is adapted for pivoting movement relative to the second support about an axis aligned with the conveying direction such that the first support forms an acute angle relative to the first support. The apparatus may also include at least one hinge for connecting the first support to the second support. A support post may be provided for supporting the bed above the floor. The support post may be connected to the hinge, which may be provided along a major or longitudinal axis of the bed.

The apparatus may further include an actuator for raising the first support relative to the second support. The actuator may comprise a turnbuckle adapted for manually raising and lowering the first support relative to the second support. Alternatively, a non-manual actuator may be used.

The bed may be cantilevered above the floor. This may be achieved by providing support posts along one side of the conveyor only. The posts may be embedded in a base, which may form part of the floor underlying the conveyor.

The first and second supports may each comprise a plurality of spaced, generally parallel longitudinal members connected together by a plurality of spaced, generally parallel transverse support members. The longitudinal members may have a generally circular cross section, which helps to maintain cleanliness by preventing the pooling or accumulation of liquids on the outer surfaces thereof.

Another aspect of the disclosure relates to a conveyor including at least one post for supporting the conveyor above a floor. The post is embedded in a curable material forming a base for supporting the conveyor in a cantilevered position relative to the post. The curable material may comprise concrete.

A further aspect of the disclosure is a conveyor bed comprising a frame including support rails adapted for supporting a conveyor belt that do not include horizontal, flat surfaces on which liquid may accumulate during cleaning. The bed includes a post for supporting the frame. The post may have a tapered top face to also prevent liquid accumulation.

Still a further aspect of the disclosure relates to an apparatus for conveying objects above a floor in a conveying direction, comprising: a conveyor belt including a forward run and a return run; and a bed for supporting the conveyor belt, the bed having an upper support for engaging the forward run of the belt and a fixed lower support for engaging the return run of the belt. The upper support is connected to the lower support by at least one hinge for allowing the upper support to pivot relative to the lower support.

The hinge may be adapted to pivot the upper support at an angle of at least about 45 degrees relative to the lower support. The hinge may be arranged to pivot the upper support about an axis aligned with the conveying direction. An actuator may be provided for causing the upper support to pivot relative to the lower support. The belt may comprise a modular link chain including a plurality of rows of links connected together by at least one removable connector.

Yet a further aspect of the disclosure pertains to a method of handling a conveyor including a conveyor belt for conveying objects in a conveying direction and having a forward run along an upper support and a return run along a fixed lower support connected to the upper support, including raising the upper support relative to the lower support. The raising step may comprise pivoting the upper support about an axis aligned with the conveying direction. The raising step may further comprise raising the upper support including a first section of the belt relative to the fixed lower support including a second section of the belt disconnected from the first section of the belt.

DETAILED DESCRIPTION

Figure 1:
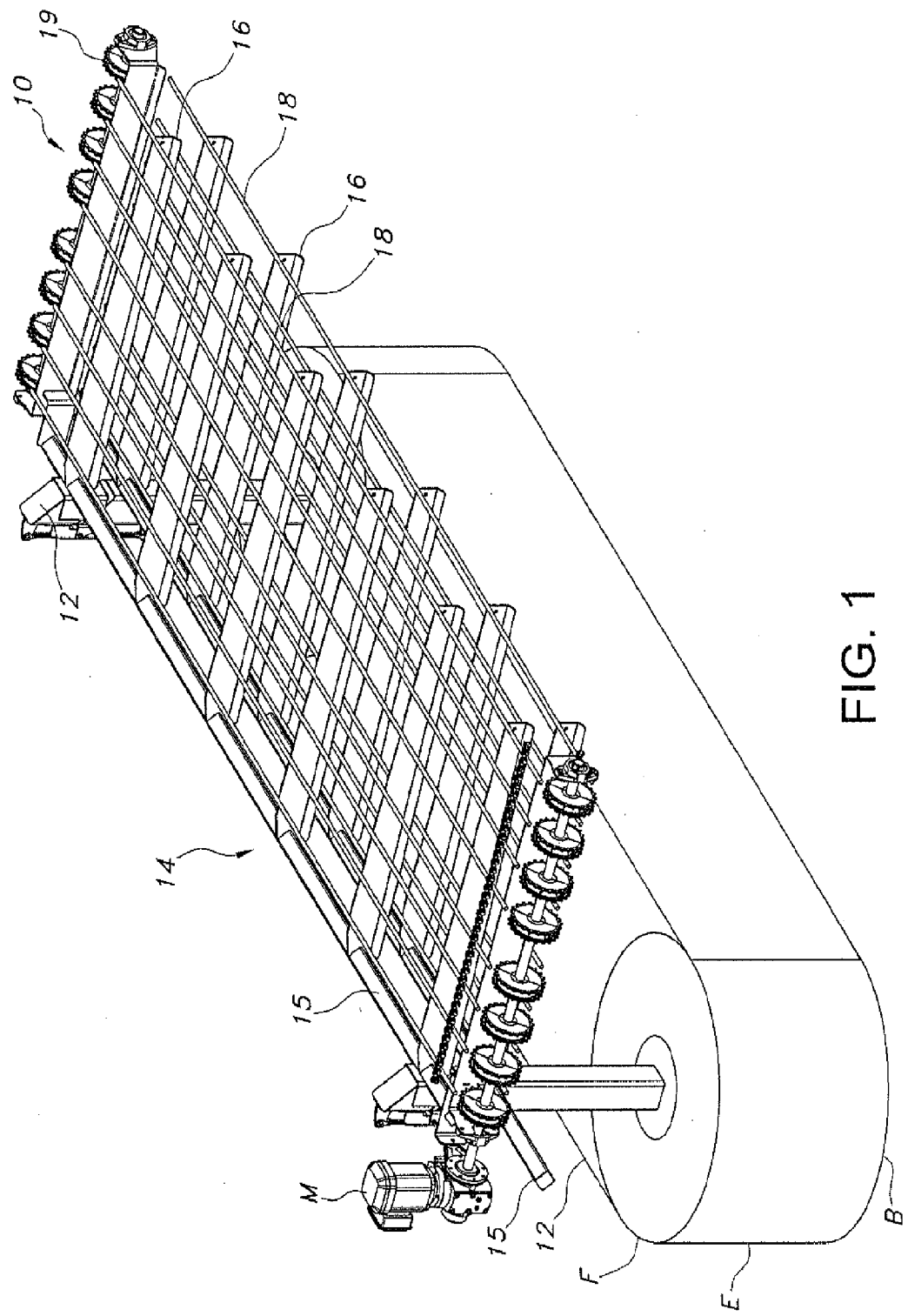
FIG. 1 is a perspective view of a conveyor according to the disclosure.

With reference to the perspective view of FIG. 1, an apparatus for conveying objects comprises a conveyor 10, which is illustrated without a conveyor belt or chain for ease of reference. As will be better understood upon reviewing the description that follows, the conveyor 10 is specially adapted with several independent features that, alone or together, allow for enhanced and efficient cleaning, and also provide general ease of access to the moving parts. Consequently, the ability to clean the conveyor 10 is enhanced, which may not only improve efficiency but also lower the cost of operation.

Figure 2:
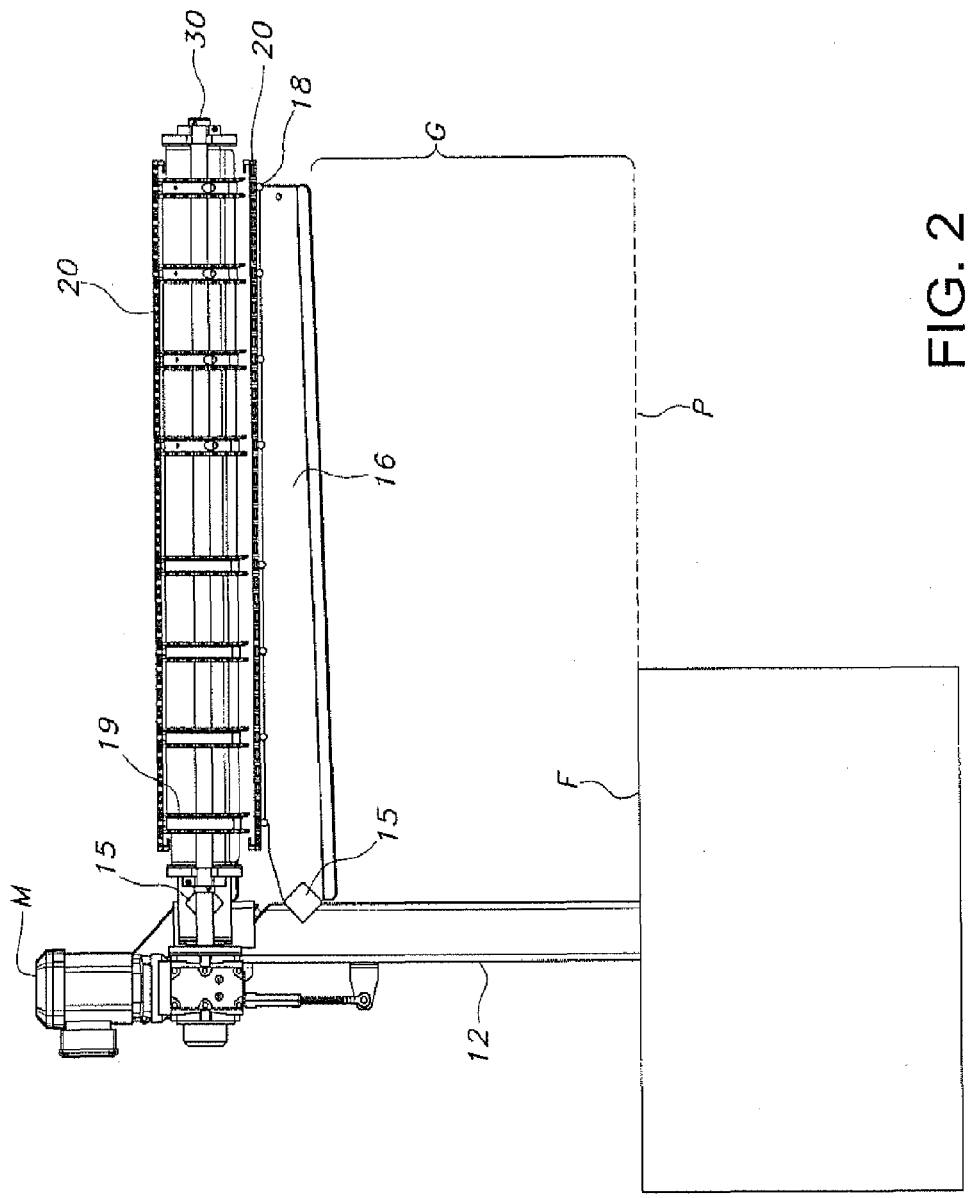
FIG. 2 is an end view of the conveyor of FIG. 1, including a conveyor chain.
Figure 3:
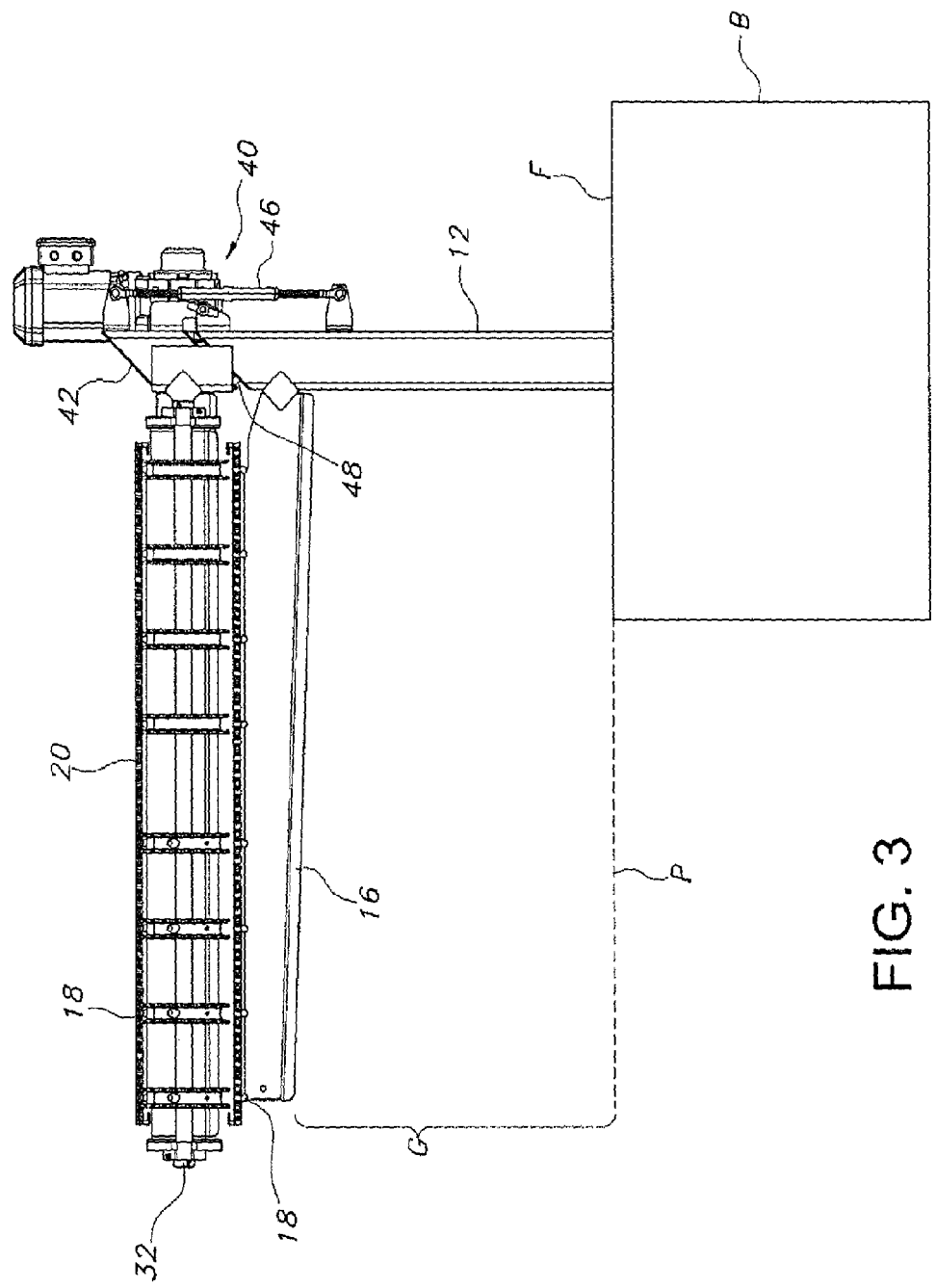
FIG. 3 is an opposite end view of the conveyor of FIG. 2.

In accordance with one aspect of the disclosure, the conveyor 10 is supported above the ground or floor F in a cantilevered fashion. This may be achieved using supports, such as generally vertical or upright posts 12 and an associated support structure connected to the posts for supporting the conveyor belt or chain. The support structure in the illustrated embodiment comprises a bed for the conveyor belt or chain, which bed may include a frame 14 connected to the posts 12 and having a major plane generally parallel to the plane of the floor F below the conveyor. To provide the cantilevered support in the proposed manner, the posts 12 are positioned along only one side of the frame 14 forming the bed. Consequently, a gap G exists between the opposite side and the plane P of the floor F, as illustrated in FIGS. 2 and 3 (which floor F may also be extended to underlie the frame 14 entirely, but is shown in a limited fashion to illustrate the nature of the support).

The posts 12 may be secured to the floor F, or may extend into and beneath the plane P of the floor F for added stability. For example, the lower portions of the posts 12 may be partly embedded in a base B, which may form part of the floor F. This base B may be at least partially fabricated of a material E that can receive or be poured around the posts 12 and then cure or harden to support them, such as for example concrete, resin, or the like.

One advantage of this cantilevered configuration is that an operator may easily access the underside of the conveyor and the floor beneath the conveyor from the side opposite the posts 12. This makes cleaning and maintaining the conveyor 10 and the conveyor area significantly easier than with a conveyor having supports along both sides of the length of the conveyor or other interfering structures that preclude such full access.

In one embodiment, the frame 14 includes one or more elongated beams 15, extending along a single side of a length L of the conveyor 10, which is aligned with the conveying path extending in the conveying direction (which may be bi-directional). Each beam 15 supports a plurality of transverse members 16 spaced apart from each other in the longitudinal direction and extending across the full width of the frame 14. Additionally, a plurality of longitudinal members 18 extend between the transverse members 16 and along the length of the frame 14 to provide support surfaces for engaging and supporting the conveyor belt or chain may travel (including along both a return and a forward run, with the underside of the chain 20 engaging the members 18 along the forward run and the conveying surface S engaging the members 18 along the return run).

Figure 2A:
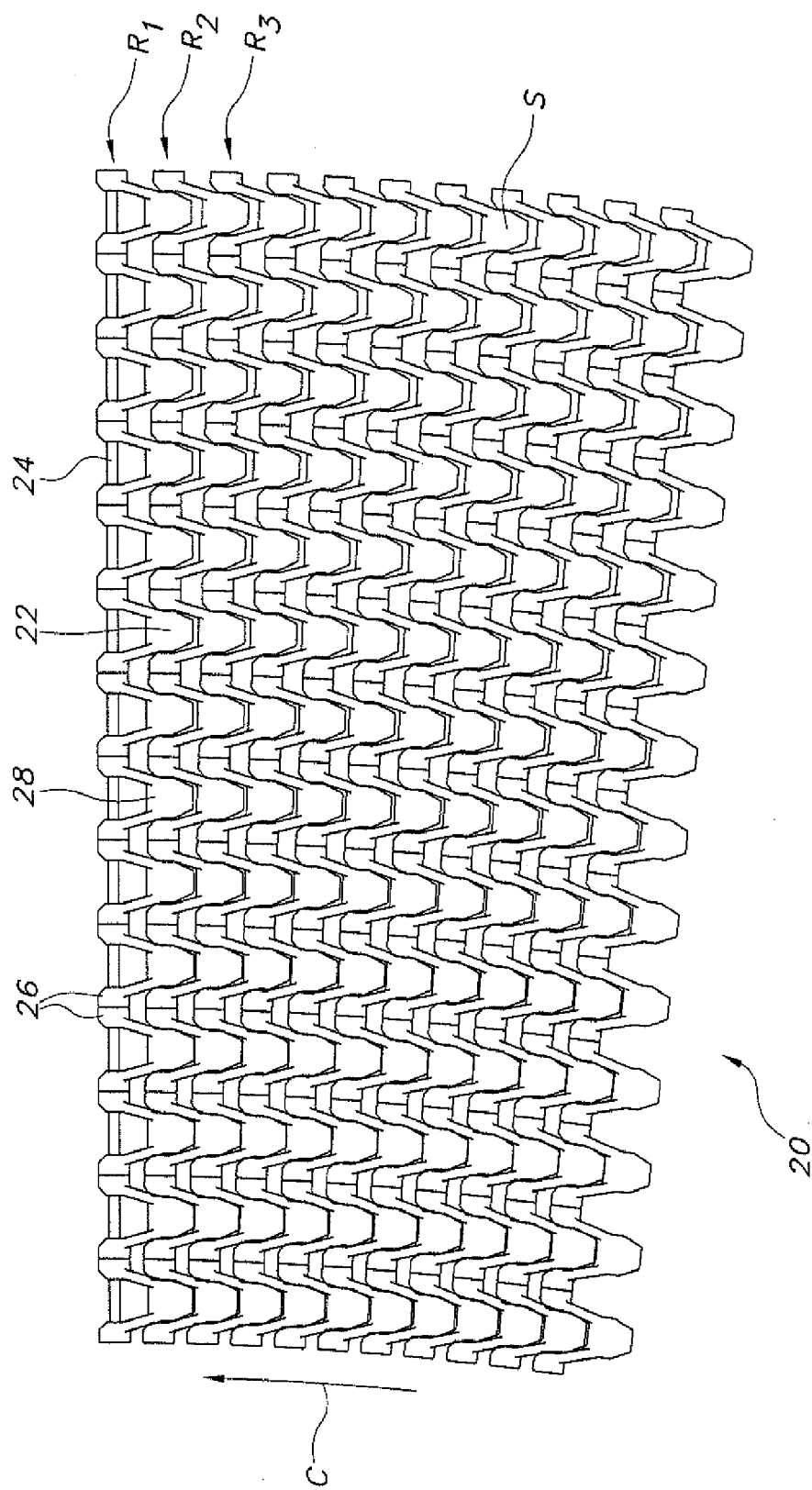
FIG. 2a is a plan view of an exemplary conveyor belt for possible use with the conveyor of FIG. 1.

As noted previously, the conveyor 10 may be used in conjunction with a belt or chain 20, as shown in FIGS. 2 and 3. As indicated in FIG. 2a, this belt or chain 20 may include modular links 22 (including outer side links 23) arranged in spaced apart rows (note rows $R_1 \ldots R_n$) to create a conveying surface S for supporting the objects being conveyed and moving in a conveying direction, as indicated by arrow C. The chain 20 as illustrated is capable of side flexing, but as should be appreciated this capability is optional for use in conveying objects along a linear path.

Figure 8:
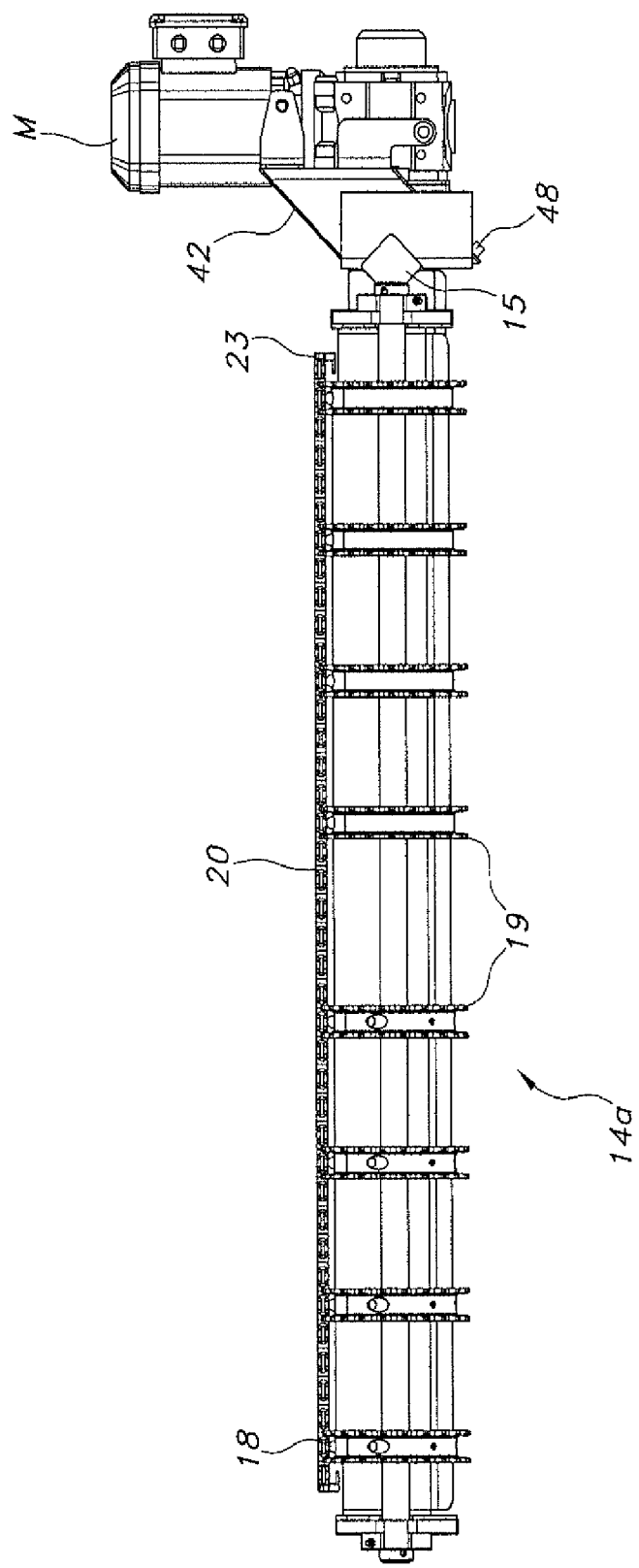
FIG. 8 is an end view showing the chain of FIG. 2a associated with the upper conveyor section.

Each link 22 may include a pair of legs 26 and an apex 28. Special outer side links 23 may also include depending arms and guide tabs, as indicated in FIGS. 2, 3 and 8. The links 22, 23 may be smooth and free of crevices to prevent accumulation of debris and bacteria. Though not meant to be limiting, the links 22 may be formed of an inexpensive, lightweight, and durable material, such as Acetal, using well-known forming techniques (including possibly co-molding of different materials). A more complete description of one possible conveyor belt or chain 20 is provided in U.S. Pat. No. 4,953,693, which is incorporated by reference.

Figure 7:
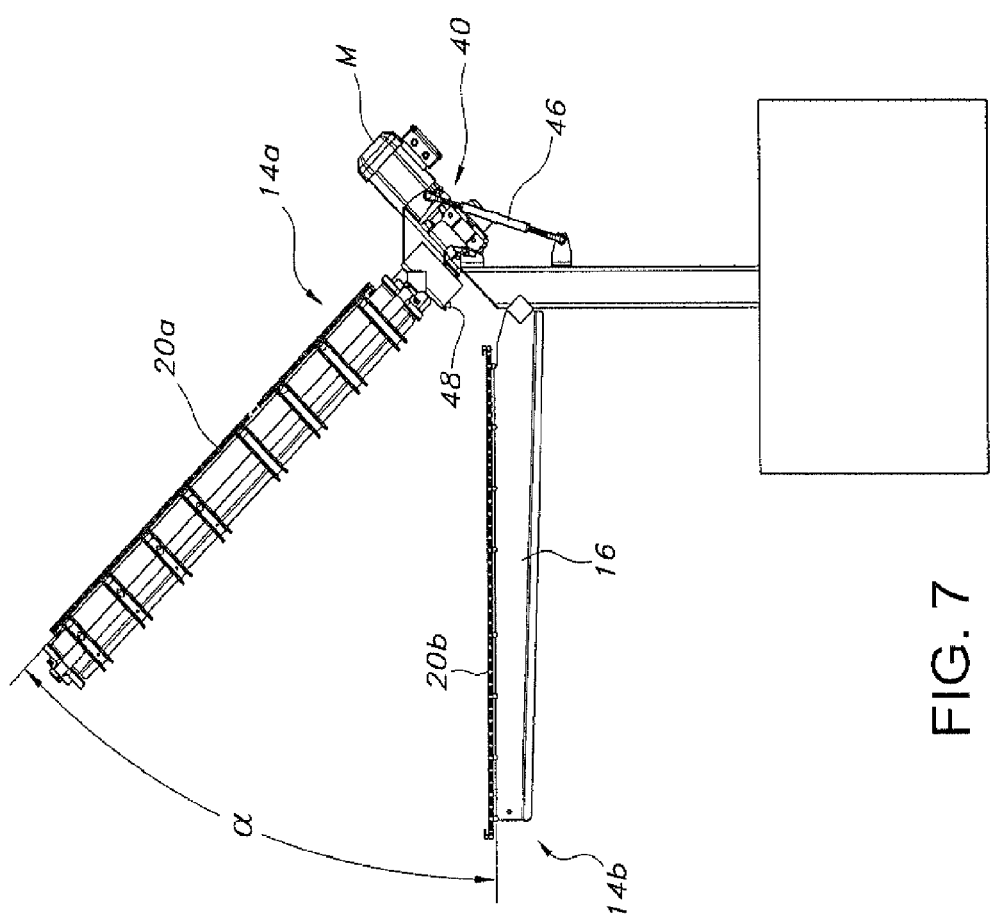
FIG. 7 is an end view showing the conveyor including upper and lower sections that are movable relative to each other.

Adjacent rows $R_1$, $R_2$ of the links 22, 23 are interconnected by transverse rods 24, which are also referred to in the vernacular as "cross rods," "hinge pins," etc. Specifically, a single transverse rod 24 may pass through an aperture in the apex 28 of each link in one row $R_1$ as well as an aperture in the legs 26 of each link of an adjacent row $R_2$ in order to hold the rows together and generally form the conveying surface S. Any single transverse rod 24 may be easily removed so that the chain 20 can be divided into sections of essentially any desired length (such as sections 20a and 20b, as shown in FIG. 7). Though not limiting, the rods may take the form of steel rods, which may be mild or stainless steel. Further, the rods may be coated to reduce friction and aid in cleaning.

The conveyor 10 may further include sprockets 19 to aid in conveyance of the chain 20. The sprockets 19 may be positioned at each end of the conveying length L. At one end, the sprockets 19 may be supported by a shaft 30 driven by a motor M carried by the frame 14, and at the opposite end by a support shaft 32 adapted for idling. The shafts 30, 32 may be supported by transverse members 16, which are also connected to the respective beams 15. The sprockets 19 may comprise split sprockets, which may be easily disassembled and removed from the shafts 30, 32 while still connected to the conveyor 10.

Figure 5:
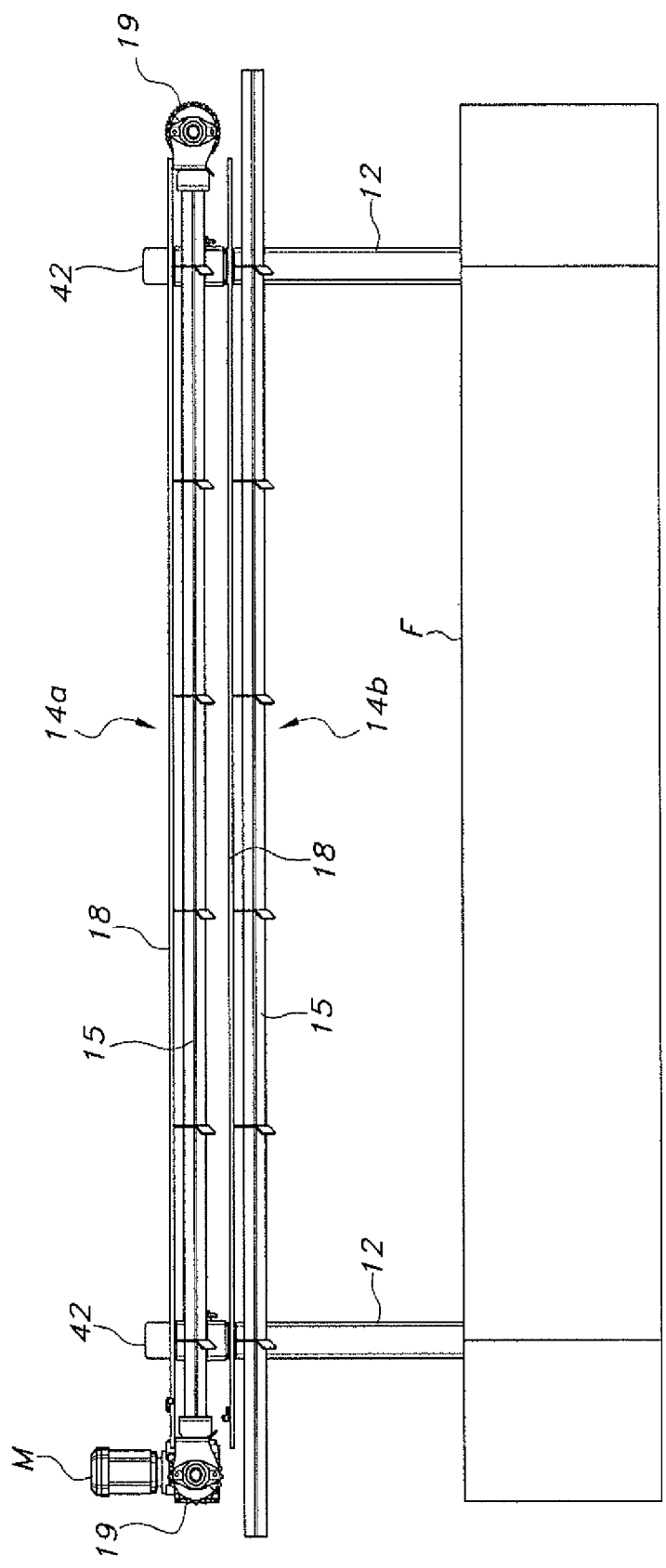
FIG. 5 is a front view of the conveyor of FIG. 1.
Figure 6:
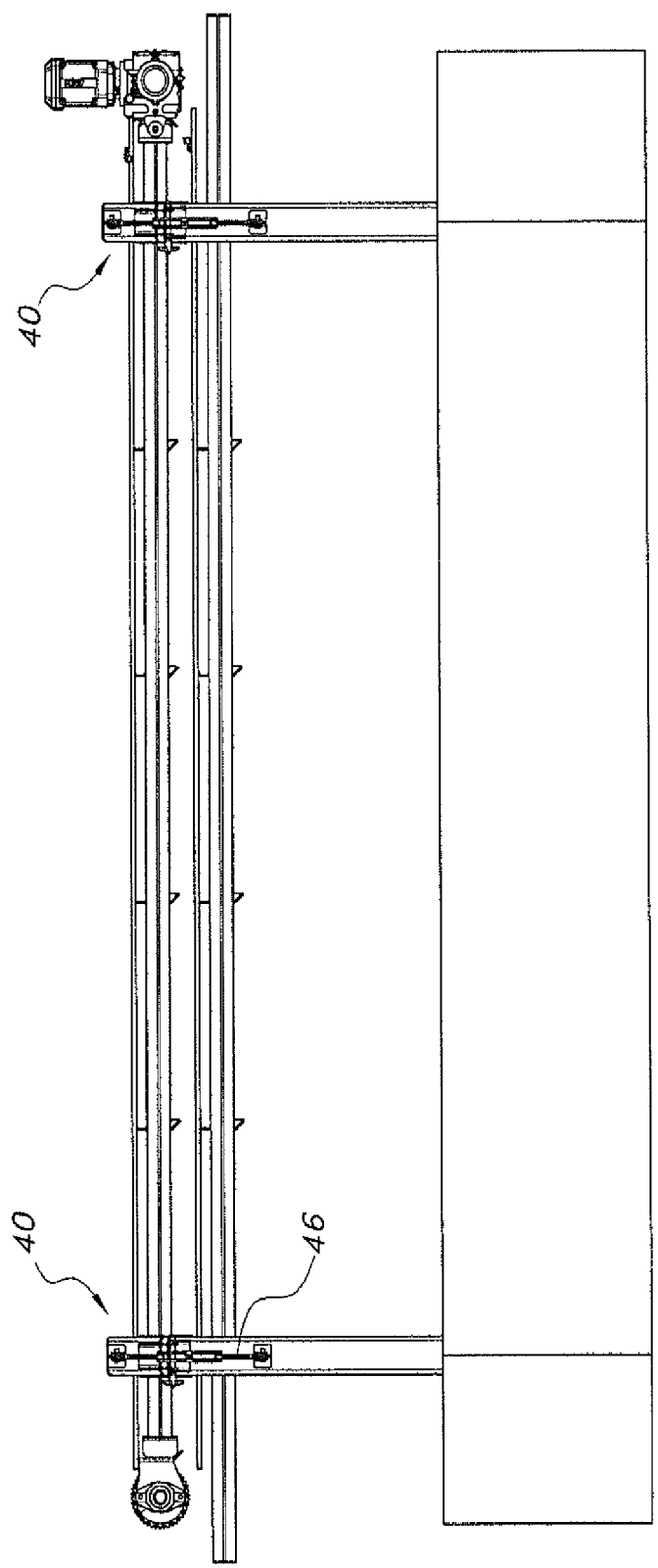
FIG. 6 is a rear view of the conveyor of FIG. 1.

In the illustrated embodiment, the longitudinal members 18 extend beyond the transverse members 16, spanning any gap between the sprockets 19 and the next-adjacent transverse member (which may support the shafts 30, 32, as seen in FIGS. 5 and 6). This prevents any "dip" that the chain 20 may make in this otherwise unsupported region of the conveyor 10. The leading and trailing ends of the longitudinal members 18 may also be sloped or tapered in the vertical direction to help ensure a smooth transition of the chain from the forward to the return run, or vice versa.

The depending arms of the side links 23 may help to provide a guiding function upon engaging the outermost longitudinal member 18 along the corresponding portions of the frame 14. However, the side links 23 are preferably arranged so as to not engage any structure during the usual mode of usage. This advantageously means that the chain 20, once divided into sections, may simply be lifted from the frame 14 since no guide rail or like structure captures the links 22, 23 in the illustrated embodiment.

In accordance with one aspect of the disclosure, and referring to FIGS. 5, 6, and 7, the frame 14 forming the conveyor bed may comprise an upper support 14a for supporting the chain 20 along a forward or upper run and a lower support 14b for supporting the chain along a return or lower run. The upper and lower supports 14a, 14b may be connected such that one may be moved (e.g., raised and lowered) relative to the other in a controlled manner (such as like a clam shell), and without being fully disconnected from the conveyor 10. As should be appreciated, and as discussed further here, this allows the supports 14a, 14b to separate (thus facilitating cleaning and repair), and then return to the operative position with a minimal amount of effort.

Figure 4:
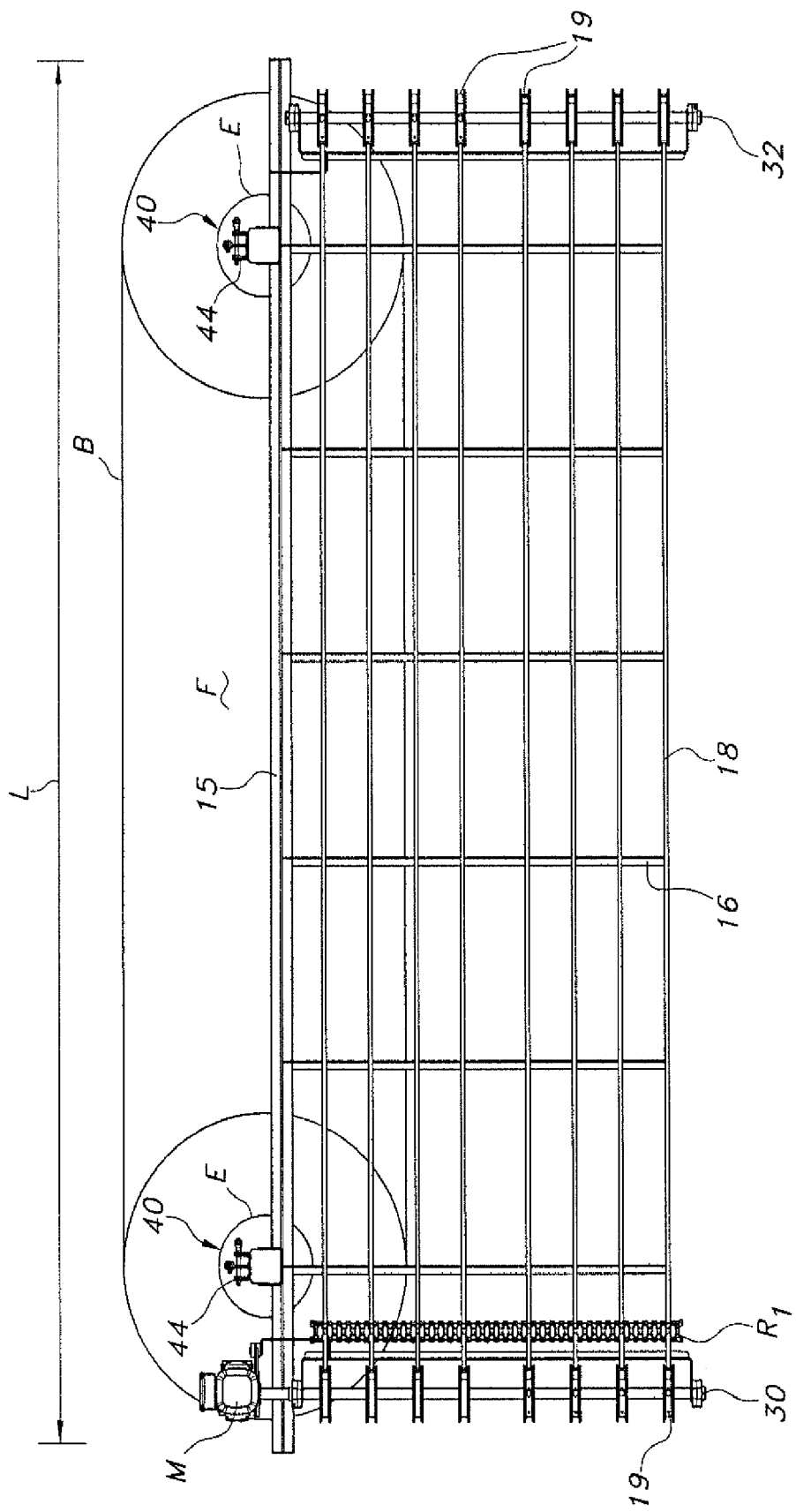
FIG. 4 is a top plan view of the conveyor of FIG. 1.

As perhaps best understood with reference back to FIGS. 3, 4 and 6, this may be accomplished by providing one or more hinges 40 for pivotally interconnecting the portions of the frame 14 forming the upper and lower supports 14a, 14b. For example, a hinge 40 may be associated with each post 12 and connected to a pivot member 42 along the major or longitudinal axis of the conveyor 10. The hinge 40 may include a hinge pin 44 forming a pivot point between the upper and lower supports 14a, 14b. As should be appreciated, this hinge 40 thus allows for the lower and upper supports 14a, 14b to be moved apart (such as from the normal or home, generally parallel condition as shown in FIG. 1) in a pivoting manner about the longitudinal axis corresponding to length L, as depicted in FIG. 7 (and with the corresponding upper portion or section 20a of the chain 20 when disconnected, as well as the sprockets 19, shafts 30, 32, and motor M when connected to the upper support 14a of frame 14).

The hinge 40 may also be adapted for being moved to and held in a desired position, such as when the lower support 14a is separated from the upper support 14b. For example, a manual actuator, such as turnbuckle 46 may be used. The turnbuckle 46 may be fixedly attached to the post 12 and the pivot member 42 at opposite ends, and advantageously is simple in construction and thus easy to clean. Alternatively, other manual or automatic means for actuating and holding the position of a hinged object once actuated (e.g., a jack, pneumatic or hydraulic cylinder, screw, or the like) may be used. For example, a linear actuator (not shown) may be provided for moving (e.g., raising and lowering) the lower support 14b relative to the upper support 14a about the hinges 40, which may then be held in place (including possibly using manual force). Spacers 48 may be associated with the post 12 or pivot member 42 to maintain a level condition despite the presence of the hinges 40, which introduces a gap between the hinged structures (and may be used to alter the relative planar alignment of the supports 14a, 14b).

In the illustrated embodiment, the upper support 14a is fixedly attached to the pivot member 42, while the lower support 14b is fixedly attached to the post 12. This allows the upper support 14a to move relative to (e.g., up and away from) the lower support 14b, as can be seen in FIG. 7. In other words, the conveyor is capable of being positioned in at least a raised configuration and a lowered configuration (such as, for example, at a fixed angle α, which may be in the range of 1-90 degrees from the horizontal, and possibly about 30-45 degrees, and specifically about 45 degrees in one embodiment). This operation may be accomplished by sectioning the chain 20, such as by removing a transverse rod 24 and forming a generally transverse separation line in the chain (note sections 20a and 20b in FIG. 7). This dividing of the chain 20 may be performed in the vicinity of the sprockets 19 on each end of the conveyor 10 (which frees the upper support 14a from the lower support 14b), so that the chain does not interfere with the pivoting movement.

This embodiment offers the added advantage of allowing access to all sides of the chain 20 and the supports 14a, 14b. Such ease of access makes cleaning the conveyor 10 significantly easier than traditional conveyors, including by allowing for ready access to portions of the conveyor between the forward and return runs that are normally enclosed and difficult to reach. The open nature of the architecture allows for cleaning fluids to easily penetrate hard-to-reach areas associated with typical conveyors, such as the surfaces of the support rails. This can be particularly important in environments where sanitary conditions are important, such as the food industry, where food and/or debris must be periodically addressed to maintain cleanliness and prevent contamination.

In a further embodiment, the conveyor 10, and especially the frame 14, is substantially free of horizontal or flat surfaces which are parallel to the plane P of the floor F. For example, the posts 12 and pivot member 42 comprise angled surfaces as seen in FIGS. 1 and 3. Further, the beam 15, transverse members 16 and longitudinal members 18 avoid flat, horizontal surfaces. For example, the longitudinal members 18 are generally circular in cross section, and the beams 15 include angled upper surfaces (which may be created by simply reorienting a beam having a square cross section). In any situation where an element includes a surface parallel to the floor by necessity, the edges of that surface are rounded to aid in liquid run-off, such as the upper edges of the transverse members 16. This prevents accumulation of liquid, such as water, and thus helps to control the proliferation of bacteria and maintain sanitary conditions.

FIG. 8 is an enlarged end view to show that the chain 20 may be provided in a manner such that the side links 23 are not captured. This facilitates lifting of the disconnected segments or sections of the chain 20 relative to the upper or lower supports 14a, 14b. Lateral tracking of the chain 20 is generally controlled by the engagement with the sprockets 19, rather than an associated guide rail.

The foregoing description of several aspects of the embodiments disclosed herein is presented for purposes of illustration and description. The embodiments described are not intended to be exhaustive or to limit the invention to the precise form disclosed. Modifications or variations are possible in light of the above teachings. An optional feature is to provide energy to one or more components of the conveyor in order to provide a more sanitary environment, as discussed in the provisional patent application incorporated herein by reference. Also, the conveyor belt may take the form of a fabric material or the like, which may be adapted for being divided into sections to allow for the separation of the supports 14a, 14b in the desired manner and then spliced back together. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for supporting a conveyor belt for conveying objects in a conveying direction above a floor, the belt including an upper forward run and a lower return run, the upper forward run forming a conveying path extending in the conveying direction, comprising:
   a conveyor bed for supporting the conveyor belt, the conveyor bed including a first support for supporting the forward run of the belt and a second support connected to the first support for supporting the return run of the conveyor belt, the first support overlying the second support in a first, unraised position for supporting the forward run of the conveyor belt, wherein the first support for the forward run of the conveyor belt is adapted for being raised to a second position relative to the second support for the return run of the conveyor belt.

2. The apparatus of claim 1, wherein the first support is adapted for pivoting movement relative to the second support about an axis aligned with the conveying direction.

3. The apparatus of claim 1, further including at least one hinge for connecting the first support to the second support.

4. The apparatus of claim 3, further including a support post for supporting the bed above the floor, said support post being connected to the hinge.

5. The apparatus of claim 3, wherein the hinge is and arranged to pivot the upper support about an axis aligned with the conveying direction.

6. The apparatus of claim 1, further including an actuator for raising the first support relative to the second support.

7. The apparatus of claim 6, wherein the actuator comprises a turnbuckle.

8. The apparatus of claim 1, wherein the bed is cantilevered above the floor.

9. The apparatus of claim 1, wherein the first and second supports each comprise a plurality of spaced, generally parallel longitudinal members connected together by a plurality of spaced, generally parallel transverse support members.

10. The apparatus of claim 9, wherein the longitudinal members have a generally circular cross section.

11. A base for supporting the bed of claim 1 and forming at least a portion of the floor, the base including at least one embedded post connected to the bed.

12. An apparatus for conveying objects above a floor in a conveying direction, comprising:
    a conveyor belt including a forward run for moving in the conveying direction and a return run; and
    a conveyor bed for supporting the conveyor belt, the conveyor bed having an upper support for engaging the forward run of the belt and a fixed lower support for engaging the return run of the belt, and further including at least one hinge for connecting the upper support to the lower support;
    wherein the hinge is arranged to pivot the upper support about an axis aligned with the conveying direction.

13. The apparatus of claim 12, wherein the hinge is adapted to pivot the upper support at an angle of at least about 45 degrees relative to the lower support.

14. The apparatus of claim 12, further including an actuator for causing the upper support to pivot relative to the lower support.

15. The apparatus of claim 12, wherein the belt comprises a modular link chain including a plurality of rows of links connected together by at least one removable connector.

16. A method of handling a conveyor including a conveyor belt for conveying objects in a conveying direction and having a forward run along an upper support and a return run along a fixed lower support connected to the upper support, comprising;
    raising the upper support relative to the lower support by pivoting the upper support about an axis aligned with the conveying direction.

17. The method of claim 16, wherein the raising step comprises raising the upper support including a first section of the belt relative to the fixed lower support including a second section of the belt disconnected from the first section of the belt.

18. A conveyor, comprising:
    a conveyor belt; and
    a bed comprising support rails engaging the conveyor belt, wherein the support rails do not include horizontal, flat surfaces on which liquid may accumulate.

19. An apparatus for supporting a conveyor belt for conveying objects in a conveying direction, the belt including a forward run, a return run, and one or more sprockets positioned between each transition between the forward and return runs, comprising:
    a conveyor bed for supporting the conveyor belt, the conveyor bed including a first support for supporting the forward run of the belt and including at least one support rail extending in the conveying direction for engaging the conveyor belt along the forward run, and a second support connected to the first support for supporting the return run of the conveyor belt, wherein the first support is adapted for being raised relative to the second support.

20. An apparatus comprising a conveyor including at least one post for supporting the conveyor above a floor, the post being embedded in a curable material at least partially forming a base for supporting the conveyor in a cantilevered position relative to the post.

21. The apparatus of claim 20, wherein the curable material comprises concrete.

22. A conveyor bed comprising a frame including support rails adapted for engaging a conveyor belt that do not include horizontal, flat surfaces on which liquid may accumulate.

23. The bed of claim 22, further including a post for supporting the frame, the post having a tapered top face.

* * * * *